(12) United States Patent
Bavard et al.

(10) Patent No.: US 11,644,321 B2
(45) Date of Patent: May 9, 2023

(54) DRIVING ASSISTANCE METHOD FOR A PUBLIC TRANSPORT VEHICLE

(71) Applicant: ALSTOM TRANSPORT TECHNOLOGIES, Saint-Ouen-sur-Seine (FR)

(72) Inventors: Jean Bavard, Lons (FR); Sylvain Bony, Enghien les Bains (FR); Samuel Hibon, Le Mans (FR); Olivier Verstraet, Paris (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 38 days.

(21) Appl. No.: 17/105,956

(22) Filed: Nov. 27, 2020

(65) Prior Publication Data

US 2021/0164789 A1  Jun. 3, 2021

(30) Foreign Application Priority Data

Nov. 29, 2019 (FR) .................................... 19 13540

(51) Int. Cl.
*G01C 21/34* (2006.01)
*B60W 30/14* (2006.01)
(Continued)

(52) U.S. Cl.
CPC ......... *G01C 21/343* (2013.01); *B60W 30/143* (2013.01); *B60W 40/08* (2013.01);
(Continued)

(58) Field of Classification Search
CPC .......... B60W 2540/00; B60W 30/143; B60W 40/08; B60W 40/10; B61L 2205/04;
(Continued)

(56) References Cited

U.S. PATENT DOCUMENTS

2006/0200437 A1* 9/2006 Howlett .................. B61L 3/006
706/45
2010/0174440 A1 7/2010 Franchineau et al.

FOREIGN PATENT DOCUMENTS

DE      102010024800      1/2011
DE      102011013010      9/2012
WO    WO-2012119197      9/2012

OTHER PUBLICATIONS

Preliminary Search Report dated May 27, 2020 in French Application No. 1913540.

\* cited by examiner

*Primary Examiner* — Peter D Nolan
*Assistant Examiner* — Ce Li Li
(74) *Attorney, Agent, or Firm* — B. Aaron Schulman, Esq.; Stites & Harbison, PLLC

(57) ABSTRACT

The method comprises, for a given route between a starting point and a destination, and for an arrival at the destination at a given desired time:
 a preliminary step of determining and recording a plurality of vehicle mission profiles,
 at least a first instant during the journey, a step of determining an instantaneous position of the vehicle at this first instant and a desired time remaining to reach the destination,
 a step of identifying, among the mission profiles, the mission profile(s) whose curves are closest to the desired time remaining at the instantaneous position of the vehicle, and
 a step of determining new driving parameters to follow a new mission profile, the new mission profile being determined on the basis of the determined mission profiles.

10 Claims, 1 Drawing Sheet

(51) Int. Cl.
*B60W 40/08* (2012.01)
*B60W 40/10* (2012.01)
*G01S 19/42* (2010.01)

(52) U.S. Cl.
CPC .............. *B60W 40/10* (2013.01); *G01S 19/42* (2013.01); *B60W 2540/00* (2013.01)

(58) Field of Classification Search
CPC .......... B61L 27/14; B61L 27/16; B61L 3/006; B61L 3/008; G01C 21/343; G01S 19/42; G05D 1/0223; G05D 2201/0213; G08G 1/0962; G08G 1/137
See application file for complete search history.

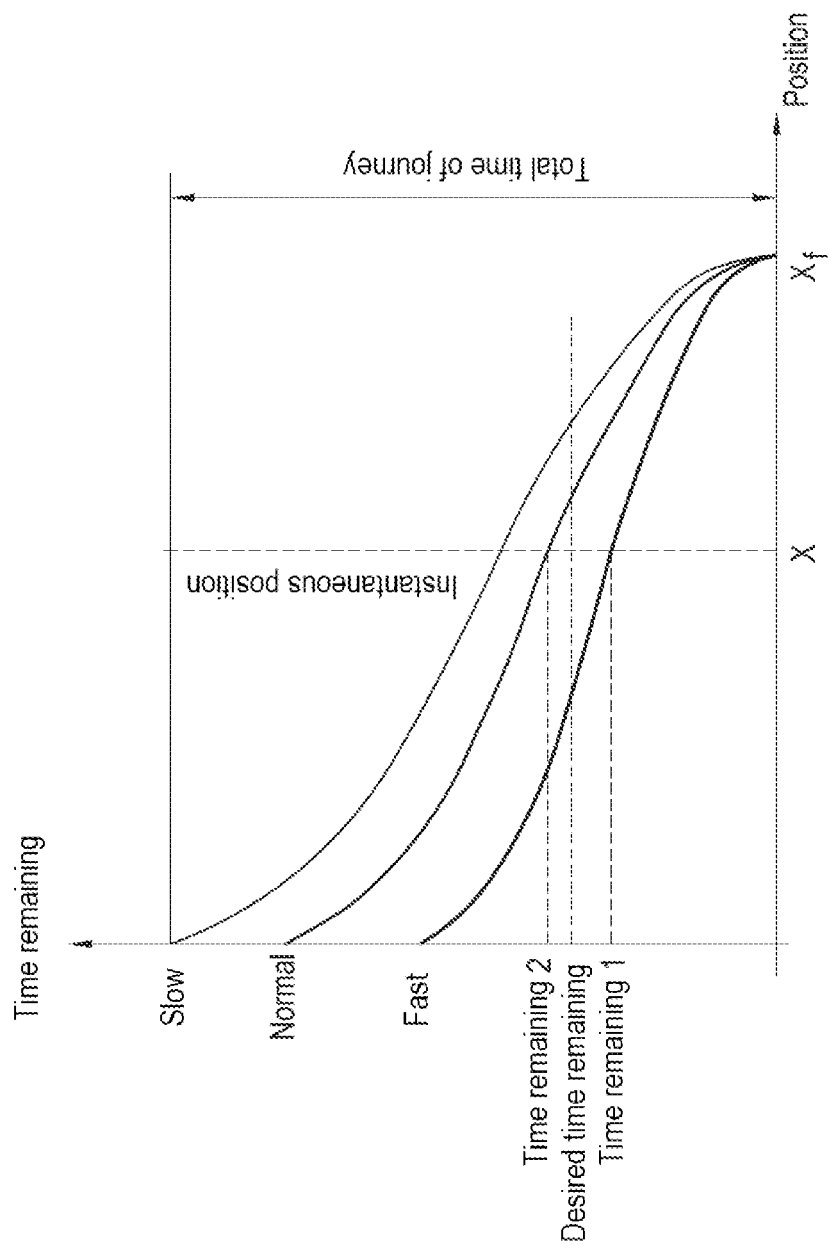

DRIVING ASSISTANCE METHOD FOR A PUBLIC TRANSPORT VEHICLE

FIELD OF THE INVENTION

The present invention relates to a method of assisting in driving a public transport vehicle.

BACKGROUND OF THE INVENTION

Known public transport vehicles perform missions between a point of departure and a destination, for a fixed period or mission schedules. Mission schedules must be respected to satisfy passengers, and to optimize the planning of missions for various vehicles on the same route, for example.

To this end, a mission profile is determined associating a plurality of vehicle positions, the schedule and/or an instantaneous speed of the vehicle.

If, at a given moment during the mission, the mission schedules are not respected, a new mission profile is calculated to adapt it to the mission schedules. However, such a method is not entirely satisfactory. In fact, the calculation of a new mission profile takes into account many parameters and requires significant and complex calculations.

Furthermore, to respond to environmental and economic issues, it is important to improve the energy efficiency of public transport vehicles by managing their energy consumption as effectively as possible.

The object of the invention is, in particular, to remedy the aforementioned drawbacks by providing a method of driving assistance making it possible to adapt the driving parameters of the vehicle dynamically in order to comply with the mission schedules of the vehicle while promoting the energy efficiency of the vehicle.

SUMMARY OF THE INVENTION

To this end, the object of the invention is a method for assisting in driving a public transport vehicle, comprising, for a given journey between a starting point and a destination, and for an arrival at the destination at a given desired time:

a preliminary step of determining and recording a plurality of mission profiles of the vehicle, each profile being formed by a curve of time remaining to reach the destination as a function of a position of the vehicle on the route according to parameters of driving data associated with this profile, at at least a first instant during the journey, a step of determining an instantaneous position of the vehicle at this first instant and a desired time remaining to reach the destination, the desired time remaining being obtained by the difference between the desired time given to arrive at the destination and the first instant, a step of identifying, among the mission profiles, the mission profile(s) whose curves are closest to the desired time remaining at the instantaneous position of the vehicle, and a) in the case where the desired remaining time is less than the lowest remaining time at the instantaneous position among all the profiles, a step of determining new driving parameters to follow a new mission profile, the new mission profile being the profile whose time remaining is the lowest at the instantaneous position among all the determined mission profiles, b) in the case where the desired time remaining is greater than the highest time remaining at the instantaneous position among all the profiles but below a predetermined value, a step of determining new driving parameters to follow a new mission profile, the new mission profile being the profile with the highest time remaining at the instantaneous position among all the determined mission profiles, c) in the case where the desired time remaining is, at the instantaneous position, between the time remaining of two profiles comprising an upper framing profile whose time remaining at the instantaneous position is immediately greater than the desired time remaining and a framing profile whose time remaining at the instantaneous position is immediately less than the desired time remaining, a step c1) of calculating weightings from the desired time remaining at the instantaneous position and the time remaining at said instantaneous position for each framing mission profile, the weightings comprising a first weighting and a second weighting and being calculated as follows:

$$W1 = \frac{(RT2 - RT)}{(RT2 - RT1)} \text{ and}$$

$$W2 = \frac{(RT - RT1)}{(RT2 - RT1)},$$

where W1 is the first weighting, intended to be applied to the lower profile,

W2 is the second weighting, intended to be applied to the upper profile,

RT is the desired time remaining at the instantaneous position,

RT1 is the time remaining at the instantaneous position for the lower framing profile, and RT2 is the time remaining at the instantaneous position for the upper framing profile.

and a step c2) of determining new driving parameters to follow a new mission profile, the new mission profile being an intermediate profile weighted between the framing mission profiles as a function of the results obtained in the weighting calculation step.

A method according to the invention may also comprise one or more of the following characteristics, taken alone or in any technically feasible combination:

the driving parameters comprise at least one parameter chosen from an instantaneous speed, a position of a driving lever and a tractive effort of the vehicle;

the step of determining new driving parameters comprises a step of determining a target speed to be reached within a predetermined time to follow the new mission profile, a step of determining an instantaneous speed of the vehicle, and a step indicating driving instructions to a driver of the public transport vehicle, said driving instructions comprising instructions for modifying the instantaneous speed in order to approach the target speed;

the step of determining new driving parameters comprises a step of determining a target speed to be reached within a predetermined time to follow the new mission profile, a step of determining an instantaneous speed of the vehicle, and a step of automatic modification of the instantaneous speed in order to approach the target speed;

in the step of determining new driving parameters c2), the target speed is calculated as follows:

$$W1*S2+W2*S1 \neq 0$$

if $$TS=((S2*S1))/((W1*S2+W2*S1))$$

where TS is the target speed profile to be reached within a predetermined time frame,
W1 is the first weighting,
W2 is the second weighting,
S1 is the speed profile at the instantaneous position for the lower framing profile, and
S2 is the speed profile at the instantaneous position for the upper framing profile, and in cases where $$W1*S2+W2*S1=0,$$

the target speed is 0;
the vehicle comprises a satellite guidance device for determining the instantaneous position of the vehicle and the desired time remaining;
when the vehicle makes at least one trip between a first starting point and a first destination, then a trip between this first destination becoming a second starting point, and a second destination, said vehicle performs two separate missions;
the starting point and the destination of each mission are stops or passage points on the route.

The present invention also relates to a device for assisting the driving of a public transport vehicle, the device comprising means for implementing a method for assisting driving according to the invention.

The present invention also relates to a public transport vehicle comprising such a device for assisting the driving.

BRIEF DESCRIPTION OF THE DRAWINGS

The invention will be better understood upon reading the description which follows, given solely by way of example and made with reference to the appended FIGURE, on which is shown a set of mission profile curves for a public transport vehicle on a given route, each profile being formed by a curve of time remaining to reach the destination as a function of a position of the vehicle on the route.

DETAILED DESCRIPTION OF THE PREFERRED EMBODIMENTS

A public transport vehicle according to the invention may be, for example, a railway vehicle, a tram, a bus, or any other public transport land vehicle.

A mission of the public transport vehicle is defined by a route comprising a starting point of the vehicle and a destination, and a journey time between the starting point and the destination of the vehicle on this route.

In the present description, it is understood that a vehicle making a journey between a first starting point and a first destination, then a journey between this first destination becoming a second starting point and a second destination, performs two distinct missions and not a single mission.

For example, the mission further comprises a time of departure of the vehicle from the starting point and a desired time of arrival at the destination, based on a predetermined schedule.

A driving assistance method according to the invention comprises a preliminary step of determining and recording a plurality of mission profiles of the vehicle.

For a given route, and for an arrival at the destination at a given time, a plurality of mission profiles is determined, as shown in FIG. 1.

A mission profile is formed by a curve of time remaining to reach the destination according to a position of the vehicle on the route and according to given driving parameters specific to this mission profile.

Preferably, the mission profiles are distinct at the starting point for an initial position of the vehicle where the time remaining is equal to a total time of the journey, but these profiles converge towards a single point being a final position of the vehicle on the journey.

In other words, the vehicle's departure time differs as a function of the mission profile, but the arrival time is the same for all mission profiles.

As a variant, the profiles converge towards a single point being a bus stop without the vehicle stopping.

The driving parameters comprise, for example, an instantaneous speed of the vehicle, a position of a driving lever, and/or a corresponding tractive effort.

The position of the driving lever is typically between −1 for maximum braking force and 1 for maximum tractive effort. 0 is a neutral position.

A recording of a mission profile comprises, for example, a plurality of vehicle positions, and, for each position, a time remaining, an instantaneous speed of the vehicle, a position of a driving lever and/or a corresponding tractive effort.

Preferably, the determined profiles are the profiles minimizing the energy consumed by the vehicle for the given driving parameters.

In this way, the speed profile proposed by the device is energy efficient.

Thus, for a lower vehicle speed, the curve of the mission profile is above the curve of a mission profile for a higher speed. In fact, for a given position, the slower the vehicle, the greater is the time remaining to reach the destination.

Typically, two to five mission profiles are pre-loaded and saved for each trip. We may increase this number of mission profiles.

In the example of FIG. 1, the "fast" profile is the profile for which the time of the journey is minimal. The "normal" profile is determined for a defined commercial period. The "slow" profile is the profile whose time to complete the journey is maximum, corresponding to the time of the normal profile plus a given margin. For example, the given margin is 10%.

In FIG. 1, the "fast" profile is the lowest, the "slow" profile is the highest, and the "normal" profile is between the "fast" profile and the "slow" profile.

Preferably, the step of determining and recording a plurality of vehicle mission profiles is performed outside of a vehicle mission, for example before a mission or between two missions.

Thus, it is not necessary to have means for calculating mission profiles on board the vehicle.

For example, the mission profiles may be pre-loaded and recorded in a vehicle control and monitoring system (Train Control Monitoring System—TCMS) on board the vehicle.

Thus, an additional display medium such as a mobile electronic device is not required. The presence of such a display medium is however possible.

The method then comprises, at at least a first instant during the journey, a step of determining an instantaneous position of the vehicle and a desired time remaining to reach the destination.

The instantaneous position of the vehicle is, for example, determined by a satellite guidance device.

For example, the satellite guidance device is a GPS (Global Position System) localization system installed on board the vehicle. The GPS system indicates an absolute position of the vehicle, the coordinates of which are latitude and longitude. The absolute position of the vehicle is converted into a distance between the starting point and the instantaneous position of the vehicle. The absolute position of the vehicle is also converted into the distance between the instantaneous position of the vehicle and the destination, called the distance remaining to be traveled.

The conversion is, for example, performed by a first on-board computing device.

At the starting point, the desired remaining time is equal to the total time of the journey or portion of the journey.

At the destination, the desired time remaining is equal to 0.

The desired time remaining at the first instant is obtained by the ratio between the distance remaining to be traveled and the instantaneous speed of the vehicle.

For example, the desired time remaining may be determined by a second on-board computing device. The desired time remaining is, for example, determined according to a predefined schedule that one wishes to respect. Alternatively, the desired time remaining may be determined by the GPS system.

At the instantaneous position, the mission profile(s) whose curves are closest to the desired remaining time at the instantaneous position of the vehicle is/are identified among the mission profiles previously determined and pre-loaded.

For example, the closest mission profile(s) is/are identified by a comparison device designed to compare the desired time remaining at the instantaneous position with the time remaining of each of the mission profiles, and for identifying the closest profile(s).

Three cases may be distinguished.

In a first case where the desired time remaining is less than the lowest time remaining among all the profiles, new driving parameters are determined to follow a new mission profile.

The new mission profile is the profile with the lowest time remaining among all determined mission profiles.

In the example in FIG. 1, this is the "fast" profile.

The driving parameters saved for the profile with the lowest time remaining among all the determined mission profiles are preferably applied automatically.

In a second case where the desired time remaining is greater than the highest time remaining among all the profiles but below a predetermined value, new driving parameters are determined to follow a new mission profile.

The new mission profile is the profile with the highest time remaining among all the determined mission profiles.

In the example of FIG. 1, this is the "slow" profile.

The driving parameters saved for the profile with the highest time remaining among all the determined mission profiles are preferably applied automatically.

When the time remaining is beyond the predetermined value, i.e. if the delay taken by the vehicle is such that even the fastest profile does not make it possible to arrive on time at the destination, the new mission profile is the "fast" profile as long as the delay is not made up.

In a third case, where the desired time remaining is between the time remaining of two profiles comprising an upper framing profile whose time remaining at the instantaneous position is immediately greater than the desired time remaining and a lower framing profile whose time remaining at the instantaneous position is immediately less than the desired time remaining, the method comprises a step c1) of calculating weightings from the desired time remaining at the instantaneous position and from the time remaining at said instantaneous position for each surrounding mission profile.

The weightings consist of a first weight and a second weighting and are calculated as follows:

$$W1 = \frac{(RT2 - RT)}{(RT2 - RT1)} \text{ and}$$

$$W2 = \frac{(RT - RT1)}{(RT2 - RT1)},$$

where W1 is the first weighting intended to be applied to the lower profile,

W2 is the second weighting, intended to be applied to the upper profile,

RT is the desired time remaining at the instantaneous position,

RT1 is the time remaining at the instantaneous position for the lower framing profile, and RT2 is the time remaining at the instantaneous position for the upper framing profile.

The weightings are, for example, calculated using a third on-board calculating device.

The weightings allow the calculation of new driving parameters to be applied.

The method comprises, following step c1), a step c2) of determining new driving parameters to follow a new mission profile, the new mission profile being a weighted intermediate profile between the surrounding mission profiles in depending upon the results obtained at the weighting calculation step.

The new driving parameters are preferably applied automatically.

In all three cases, the driving parameters are transmitted to the traction and braking devices of the vehicle, these devices being able to apply the new driving parameters.

Thus, an additional display medium such as a mobile electronic device is not required.

As a variant, driving instructions including the new driving parameters are transmitted to the driver.

For example, the driving instructions may be displayed by display means suitable for displaying driving instructions for the driver.

These new driving parameters comprise, for example, a target speed to be reached within a predetermined time. The delay is, for example, between 5 seconds and 60 seconds, typically equal to 30 seconds.

For example, in the third case, the target speed is calculated as follows:
if $$W1 * S2 + W2 * S1 \neq 0,$$

$$TS = \frac{(S2 * S1)}{(W1 * S2 + W2 * S1)}$$

where TS is the target speed profile within the predetermined time frame,

W1 is the first weighting,

W2 is the second weighting,

S1 is the speed profile at the instantaneous position for the lower framing profile, and S2 is the speed profile at the instantaneous position for the upper framing profile.

In cases where W1*S2+W2*S1=0, the target speed is 0. For example, at the starting point, the target speed is 0. The display system is deactivated below a configurable speed.

The target speed profile is, for example, calculated by a fourth on-board calculation device.

The target speed profile is thus an intermediate speed profile weighted between the speeds of the two surrounding profiles.

These new driving parameters comprise, for example, a target position of the driving lever.

For example, the target position of the driving lever is calculated as follows:

$$TH = W1*H1 + W2*H2$$

where TH is the target position of the driving lever,
W1 is the first weighting,
W2 is the second weighting,
H1 is the position of the lever for the lower framing profile, and
H2 is the lever position for the upper framing profile.

The target position of the driving lever is, for example, calculated by a fifth on-board calculating device.

Preferably, the target speed is a more important parameter than the target position of the driving lever.

In the example shown, the desired time remaining at the instantaneous position x is between the "normal" profile, which is the upper framing profile, and the "fast" profile, which is the lower framing profile. The resulting weighted intermediate profile lies between the two profiles and is determined by calculating the weightings applied to the two framing profiles.

Preferably, the steps of the method according to the invention are repeated during the journey. For example, the steps of the method are implemented at predetermined positions of the vehicle, or at predetermined times. For example, the method steps are implemented every 500 meters. However, distances less than or greater than 500 meters may be considered without this modifying the method.

Thus, the method according to the invention makes it possible to reduce the requirements in terms of calculation time and in calculation capacity on board the vehicle. In fact, the interpolation of the speed profiles requires little computing capacity, while ensuring the longest possible travel time while respecting the time table, which guarantees that the energy consumed will be as low as possible.

For example, if the vehicle is late at a given position, it suffices to interpolate between two surrounding profiles in order to define the new mission profile.

The present invention also relates to a device for assisting driving.

The driving assistance device comprises, for example, the satellite guidance device, the comparison device designed to compare the desired time remaining at the instantaneous position with the time remaining of each of the mission profiles, and for identifying the one or more closest profiles, the first on-board computing device, the second on-board computing device, the third on-board computing device, the fourth on-board computing device and the fifth on-board computing device defined above.

Preferably, the driving assistance device comprises a processor integrating the comparison device designed to compare the desired time remaining at the instantaneous position with the time remaining of each of the mission profiles, and for identifying the most suitable closest profile(s), the first on-board computing device, the second on-board computing device, the third on-board computing device, the fourth on-board computing device and the fifth on-board computing device defined above.

The driving assistance device according to the invention is preferably an on-board device.

Thus, an additional display medium such as a mobile electronic device is not required.

The processor is, for example, integrated into the TCMS.

Preferably, the driving assistance device further comprises a memory suitable for recording the mission profiles and the driving parameters.

The memory may be, for example, integrated into the TCMS.

More preferably, the driving assistance device comprises means of communication between each computing device and the traction and braking devices so as to automatically modify the driving parameters according to the results obtained.

As a variant, the driving assistance device comprises display means suitable for displaying driving instructions intended for the driver. Preferably, the display means are integrated into the TCMS.

What is claimed is:

1. A device for assisting in driving a public transport vehicle, for a given journey between a starting point and a destination, and for an arrival at the destination at a given desired time, said device comprising a driving assistance device wherein:

said driving assistance device is configured to determine and record a plurality of mission profiles of the vehicle, each profile being formed by a curve of time remaining to reach the destination as a function of a position of the vehicle on the route according to driving data parameters associated with this profile, said driving assistance device is configured so that at a first instant during the journey, said driving assistance device determines an instantaneous position of the vehicle at this first instant and a desired time remaining to reach the destination, the desired time remaining being obtained by the difference between the desired time given to arrive at the destination and the first time, said driving assistance device is configured to identify a mission profile from said plurality of mission profiles whose curves are closest to the desired time remaining at the instantaneous position of the vehicle, said driving assistance device is configured to compare the desired time remaining with the lowest time remaining at the instantaneous position among all of said plurality of mission profiles, said driving assistance device is configured so that when the desired time remaining is less than the lowest time remaining at the instantaneous position among all of said plurality of mission profiles, said driving assistance device determines new driving parameters to follow a new mission profile, the new mission profile being the profile whose time remaining is the lowest at the instantaneous position among all the determined new mission profiles, said driving assistance device is configured so that when the desired time remaining is greater than the highest time remaining at the instantaneous position among all the profiles but below a predetermined value, determining new driving parameters to follow a new mission profile, the new mission profile being the profile with the highest time remaining at the instantaneous position among all the determined new mission profiles, said driving assistance device is configured so that when the desired time remaining is, at the instantaneous position, between the time remaining of two profiles comprising an upper framing profile whose time remaining at the instantaneous position is immediately greater than the desired time remaining and a framing profile less than the time remaining at the instantaneous position is immediately less than the desired time remaining, said driving assistance device is configured so that weightings are calculated from the desired time remaining at the instantaneous position and the time remaining at said instantaneous position for each framing mission profile, the weightings comprising a first weighting and a second weighting and being calculated as follows:

$$W1 = \frac{(RT2 - RT)}{(RT2 - RT1)} \text{ and}$$

$$W2 = \frac{(RT - RT1)}{(RT2 - RT1)},$$

where W1 is the first weighting, applied to the lower profile,
W2 is the second weighting, applied to the upper profile,
RT is the desired time remaining at the instantaneous position,
RT1 is the time remaining at the instantaneous position for the lower framing profile, and
RT2 is the time remaining at the instantaneous position for the upper framing profile; and said driving assistance device is configured so that new driving parameters are determined to follow a new mission profile, the new mission profile being an intermediate weighted profile between the surrounding mission profiles as a function of the results obtained in the weighting calculation; and $$W1 = \frac{(RT2 - RT)}{(RT2 - RT1)}$$

$$W2 = \frac{(RT - RT1)}{(RT2 - RT1)},$$

wherein said deriving assisting device is configured for transmitting the new driving parameters to traction and braking devices of said public transport vehicle, said traction and braking devices being configured to apply the new driving parameters based on the determined mission profile.

2. The device for assisting in driving according to claim 1, wherein the driving parameters comprise at least one parameter selected from the group consisting of an instantaneous speed, a position of a driving lever, and a tractive effort of the vehicle.

3. The device for assisting in driving according to claim 1, wherein determining new driving parameters comprises:
determining a target speed to be reached within a predetermined time frame to follow the new mission profile,
determining an instantaneous speed of the vehicle, and
indicating driving instructions to a driver of the public transport vehicle, said driving instructions comprising instructions for modifying the instantaneous speed in order to approach the target speed.

4. The device for assisting in driving according to claim 3, wherein the new driving parameters are determined by calculating the target speed as follows:
if $$W1*S2+W2*S1 \neq 0,$$

$$TS=((S2*S1))/((W1*S2+W2*S1))$$

where TS is the target speed profile to be reached within a predetermined time frame,
W1 is the first weighting,
W2 is the second weighting,
S1 is the speed profile at the instantaneous position for the lower framing profile, and
S2 is the speed profile at the instantaneous position for the upper framing profile, and in cases where $$W1*S2+W2*S1=0,$$

the target speed is 0.

5. The device for assisting in driving according to claim 1, wherein determining new driving parameters comprises:
determining a target speed to be reached within a predetermined time frame to follow the new mission profile,
determining an instantaneous speed of the vehicle, and
automatically modifying the instantaneous speed in order to approach the target speed.

6. The device for assisting in driving according to claim 1, wherein the vehicle comprises a satellite guidance device for determining the instantaneous position of the vehicle and the desired time remaining.

7. The device for assisting in driving according to claim 1, wherein when the vehicle performs at least one trip between a first starting point and a first destination, then a journey between this first destination becoming a second departure point, and a second destination, said vehicle performs two distinct missions.

8. The device for assisting in driving according to claim 1, wherein the starting point and the destination of each mission are stops or passage points on the route.

9. A public transport vehicle comprising a device for assisting the driving according to claim 1.

10. The device for assisting in driving according to claim 1, wherein the new driving parameters are applied automatically.

* * * * *